(12) United States Patent
Wen (10) Patent No.: US 12,342,934 B2
(45) Date of Patent: Jul. 1, 2025

(54) SLIDE RAIL STRUCTURE WITH BUFFER SEAT

(71) Applicant: Tanko Organize Company, New Taipei (TW)

(72) Inventor: Shih-Chiao Wen, New Taipei (TW)

(73) Assignee: Tanko Organize Company, New Taipei (TW)

( * ) Notice: Subject to any disclaimer, the term of this patent is extended or adjusted under 35 U.S.C. 154(b) by 83 days.

(21) Appl. No.: 18/525,468

(22) Filed: Nov. 30, 2023

(65) Prior Publication Data

US 2025/0176713 A1 Jun. 5, 2025

(51) Int. Cl.
*A47B 88/477* (2017.01)
*A47B 88/487* (2017.01)
*A47B 88/493* (2017.01)
*A47B 88/57* (2017.01)
*F16C 29/04* (2006.01)

(52) U.S. Cl.
CPC .......... *A47B 88/477* (2017.01); *A47B 88/487* (2017.01); *A47B 88/57* (2017.01); *F16C 29/04* (2013.01); *F16C 2314/72* (2013.01)

(58) Field of Classification Search
CPC .... F16C 29/04; F16C 2314/72; A47B 88/477; A47B 88/487; A47B 88/493; A47B 88/57
See application file for complete search history.

(56) References Cited

U.S. PATENT DOCUMENTS

| | | | | |
|---|---|---|---|---|
| 10,966,521 | B2* | 4/2021 | Chen | A47B 88/49 |
| 2011/0175508 | A1* | 7/2011 | Rechberg | E05F 3/108 |
| | | | | 16/49 |
| 2018/0306236 | A1* | 10/2018 | Liu | F16C 29/005 |
| 2024/0032690 | A1* | 2/2024 | Ill | A47B 88/57 |

FOREIGN PATENT DOCUMENTS

| | | | | |
|---|---|---|---|---|
| CN | 108378600 A | * | 8/2018 | ........... A47B 88/467 |
| CN | 108430268 A | * | 8/2018 | ............. A47B 88/40 |

* cited by examiner

*Primary Examiner* — Phillip A Johnson
(74) *Attorney, Agent, or Firm* — Wang Law Firm, Inc.

(57) ABSTRACT

A slide rail structure with a buffer seat, which comprises: a first rail having a first slot wall and a first side wall connected to the first slot wall, the first slot wall and the first side wall extend in different directions; a movable rail having a roller set and a side roller assembly mounted on the first rail and capable of slidably moving relative to the first rail; and a buffer seat mounted on the first side wall, the buffer seat has two engaging units, the two engaging units are disposed oppositely, and the engaging unit has an engaging hole and at least one second lock hole, thereby the buffer seat is fixed to the first rail to avoid a travel path of the roller set of the movable rail overlapping with a position of a buffer.

8 Claims, 11 Drawing Sheets

SLIDE RAIL STRUCTURE WITH BUFFER SEAT

BACKGROUND

Field of the Invention

The invention relates to a slide rail structure, and more particularly to a slide rail structure with a buffer seat.

Description of Related Art

Slide rail is a mechanical structure that is designed based on linear motion. It usually consists of two parts, a box rail and a drawer rail. The drawer rail can slide in a specified direction on the box rail and bear a certain load and moment.

Figure 1:
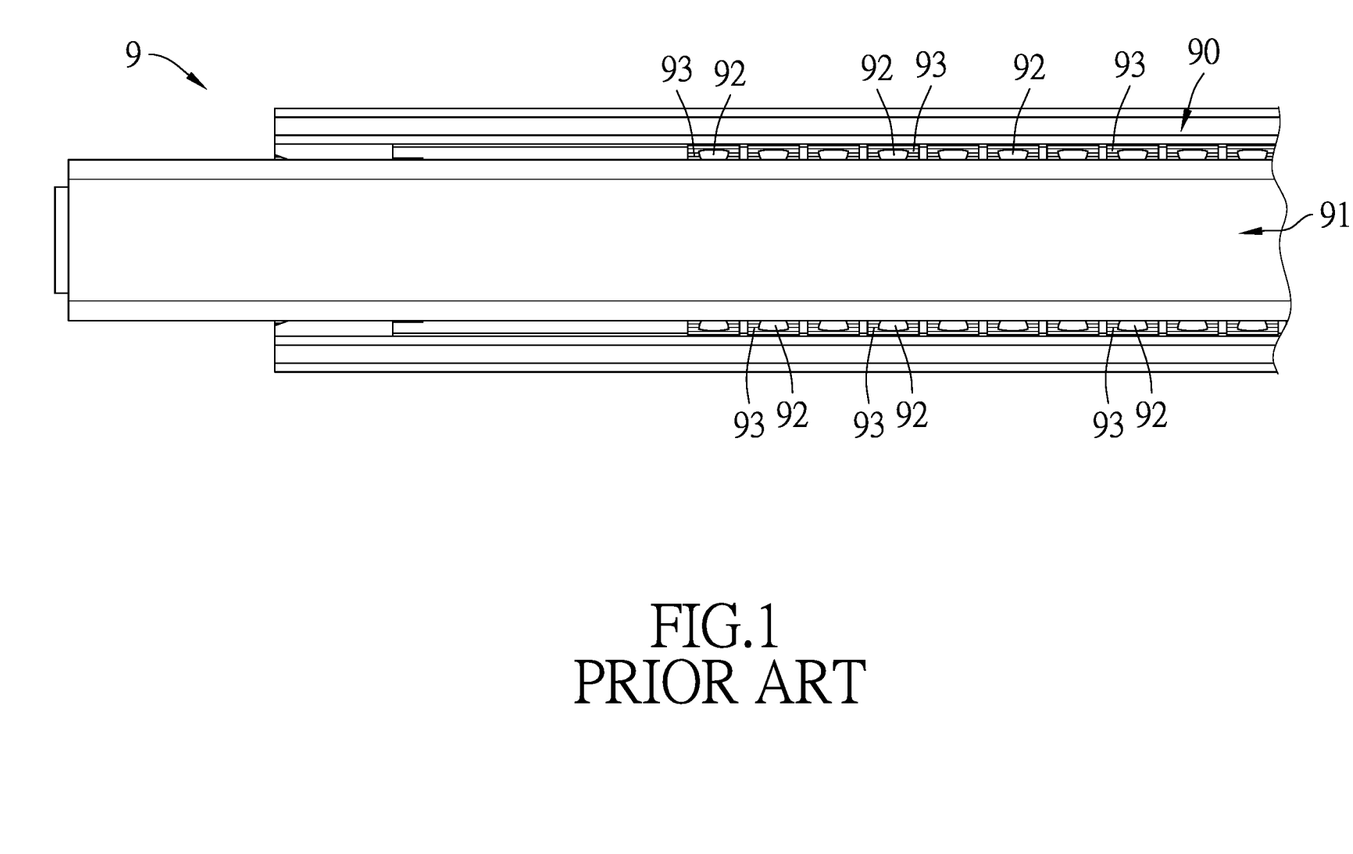
FIG. 1 is a schematic diagram of a conventional slide rail structure.

Please refer to FIG. 1. A slide rail 9 has a box rail 90 and a drawer rail 91. The box rail 90 is usually disposed on an inner side of a cabinet, and the drawer rail 91 is disposed on an outer side of a drawer corresponding to the box rail 90. A plurality of balls 92 are provided between the drawer rail 91 and the box rail 90, and a plurality of limiting elements 93 are provided for holding the balls 92 between the drawer rail 91 and the box rail 90. Through the balls 92 the drawer rail 91 is capable of reducing the impact force and friction force during relative movement between the drawer rail 91 and the box rail 90, thereby reducing noise and damage to the slide rail 9 and improving the service life and flexibility of the slide rail 9.

However, the number and size of the balls are limited by the slide rail, so a force that the balls can withstand is within a certain range. If the objects loaded in the drawer are too heavy and exceed the load limit of the balls, it will cause insufficient bearing capacity of the slide rail, and may even cause the risk of derailment or falling off. This situation is particularly common in industrial drawers or drawers that need to be loaded with heavy objects. Because the drawers are used frequently and have heavy loads, it can easily cause wear, deformation, jamming or breakage of the slide rail, affecting the service life and safety.

For this reason, drawers required to be loaded with heavy objects need to use rollers instead of balls to ensure the normal operation of the slide rail. However, the operational path of rollers is different from the operational path of balls, the size of rollers is larger than that of balls, and the travel path of rollers overlaps with the mounting position of the general damping buffer, so it is not possible to mount the damping buffer on the slide rail equipped with rollers. For this reason, a slide rail structure capable of mounting the damping buffer is needed.

SUMMARY

A main object of the invention is to provide a slide rail structure with a buffer seat. The main object is to be able to assemble a damping buffer on a drawer loaded with heavy objects without interfering paths of rollers and a slide rail.

Another object of the invention lies in being capable of achieving efficacies of easy assembling and providing high stability without performing complicated steps.

In order to achieve the above objects, the invention provides a slide rail structure with a buffer seat, comprising:
a first rail having a first slot wall and a first side wall connected to the first slot wall, the first slot wall and the first side wall extending in different directions;
a movable rail mounted on the first rail and capable of slidably moving relative to the first rail; and
a buffer seat mounted on the first side wall, the buffer seat having two engaging units, the two engaging units being disposed oppositely.

More specifically, the first rail has at least one positioning lock hole, the buffer seat has at least one first lock hole, and the first lock hole is lockingly combined with the positioning lock hole.

More specifically, the engaging unit has an engaging hole and at least one second lock hole.

More specifically, the two engaging units are disposed in mirror symmetry on the buffer seat.

More specifically, further comprising a second rail, the second rail is disposed between the first rail and the movable rail, and the second rail slides relative to the first rail.

More specifically, the second rail has a roller set, the roller set has a plurality of rollers, and the rollers enable the second rail to slide relative to the first rail.

More specifically, the second rail further has a side roller assembly, the side roller assembly penetrates the second rail, the side roller assembly has a side roller and a position-limiting unit, the side roller is rotatably mounted on the position-limiting unit, and the side roller abuts against the first slot wall.

More specifically, the first rail further has a stopper, the stopper protrudes from the first slot wall.

Summing up the above, it can be known that the slide rail structure provided by the invention can be easily assembled by disposing the rollers and the buffer seat. The buffer seat can be easily fixed and combined to the first rail by using screws, etc., to provide high stability without performing complicated steps, and then the buffer is mounted on the buffer seat, so that the invention is capable of providing buffering efficacies of high load and wear-resistant, wherein the buffer seat has the two engagement units to provide mounting in different directions to improve the flexibility and adaptability for using the invention.

DETAILED DESCRIPTION

The following is a further explanation of the technical means adopted by the invention to achieve the predetermined novel objects with reference to the drawings and embodiments of the invention, wherein the drawings have been simplified only for the purpose of illustration and are used to describe the relationships between the elements and components of the invention to illustrate the structure or method of the invention, therefore, the elements shown in the figures are not presented in actual quantities, actual shapes, actual sizes and actual proportions, and the dimensions or proportions have been enlarged or simplified to provide a better explanation. Actual quantities, actual shapes, or actual size proportions have been optionally designed and configured, and detailed element layout may be more complex.

The invention provides a slide rail structure with a buffer seat. Please refer to FIGS. 2 and 3. The invention has a first rail 1, a second rail 2, a movable rail 3 and a buffer seat 4. The second rail 2 is mounted on the first rail 1, the movable rail 3 is mounted on the second rail 2, the second rail 2 is mounted between the first rail 1 and the movable rail 3, the second rail 2 is capable of sliding relative to the first rail 1, and the movable rail 3 is capable of sliding relative to the second rail 2. The buffer seat 4 is combined with the first rail 1 to define an extending direction of the first rail 1, the second rail 2 and the movable rail 3 as a sliding direction X. More specifically, the first rail 1 is a box rail mounted on an inner side of a cabinet, the second rail 2 is a moving rail, and the movable rail 3 is a drawer rail mounted on an outer side of a drawer.

Figure 2:
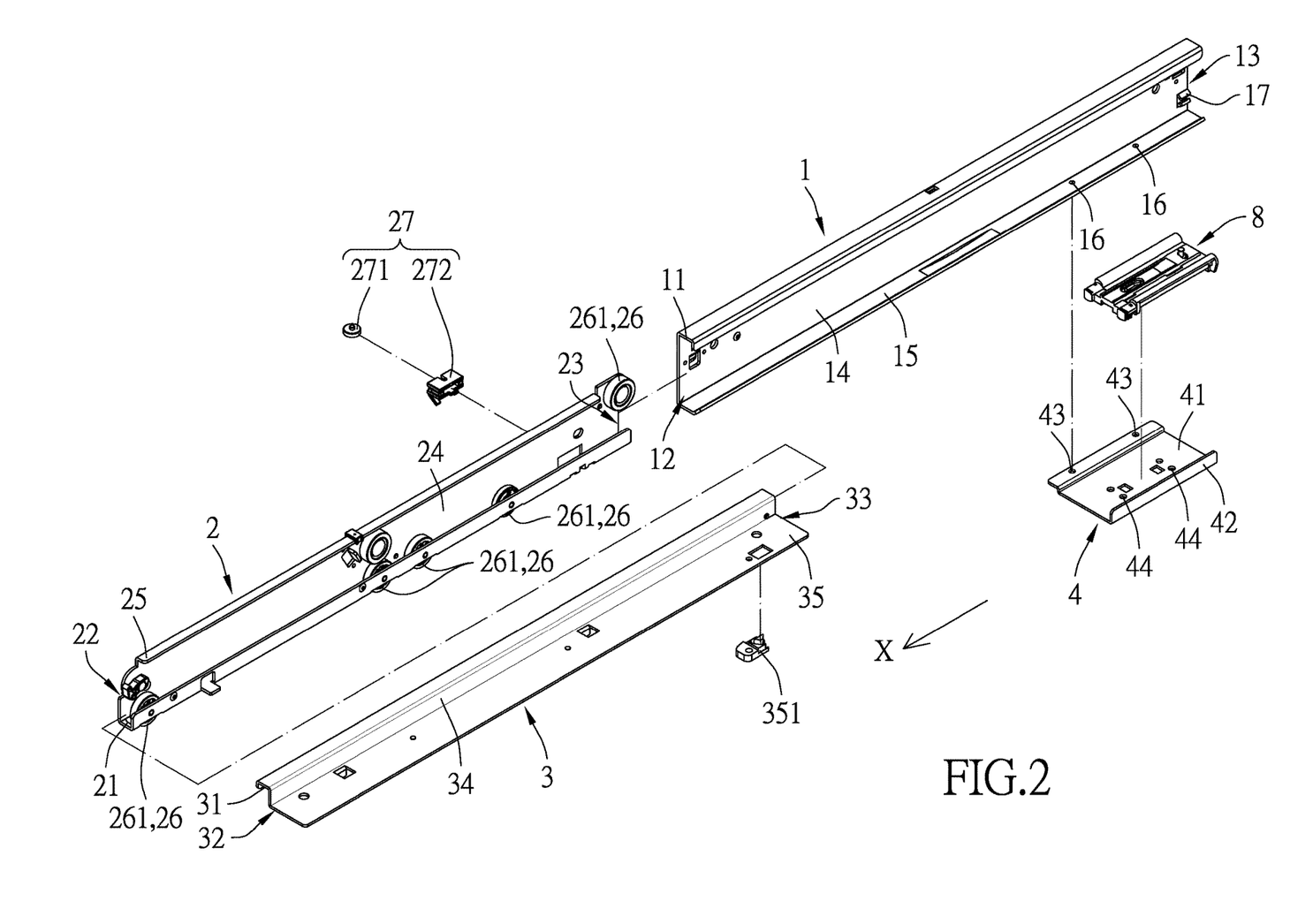
FIG. 2 is an exploded view of a preferred embodiment of the invention.
Figure 3:
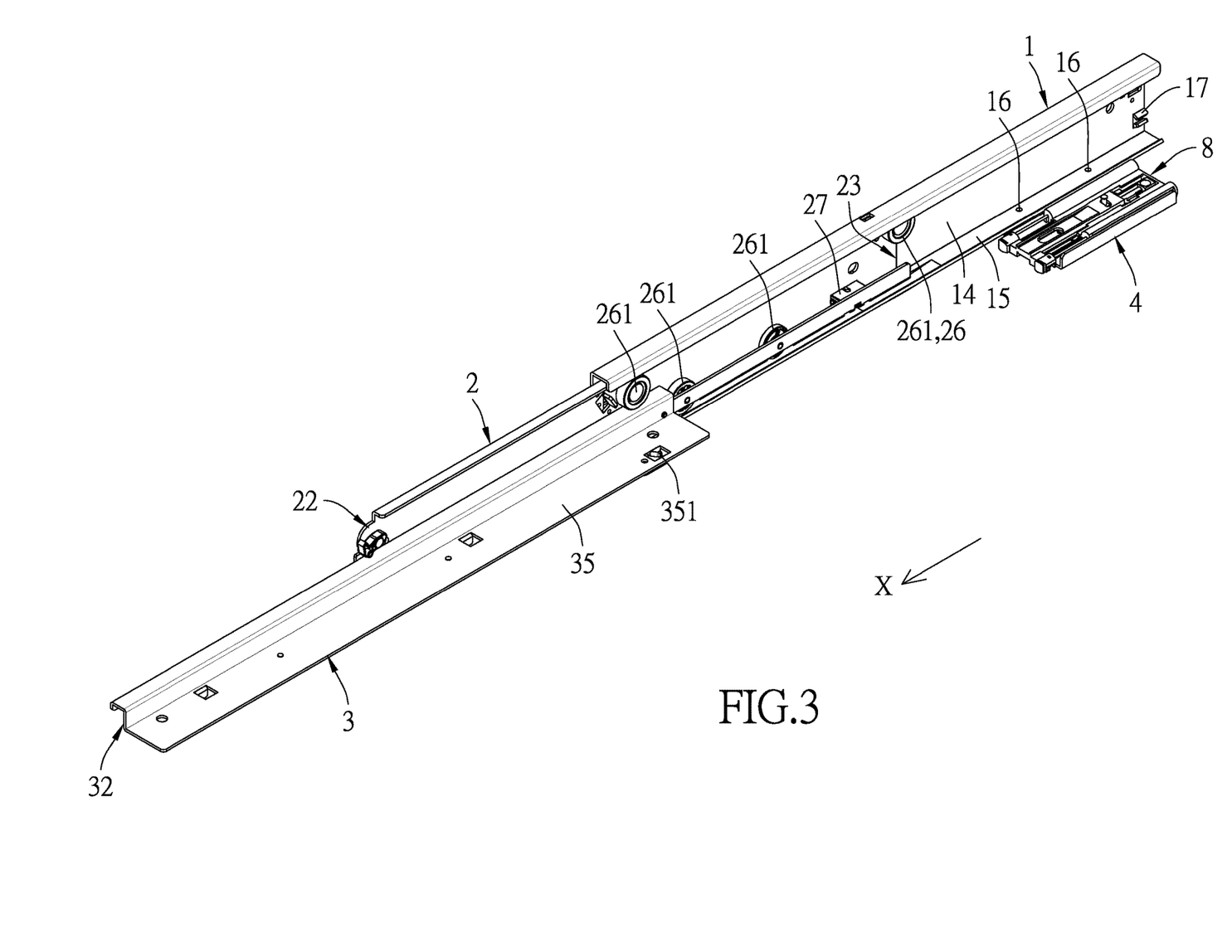
FIG. 3 is an assembly diagram of a slide rail of a preferred embodiment of the invention.

Please refer to FIGS. 2 and 3. The first rail 1 is in the shape of a long strip. The first rail 1 has a first end 12 and a second end 13 disposed oppositely. The first rail 1 has a first slot wall 14, a first transverse wall is connected to one side of the first slot wall 14, and the first transverse wall is generally L-shaped. The first slot wall 14 and the first transverse wall surround to form a first trough 11. Another side of the first slot wall 14 is connected to a first side wall 15. The first side wall 15 has at least one positioning lock hole 16. The positioning lock hole 16 is closer to the second end 13. The positioning lock hole 16 penetrates the first side wall 15. The first slot wall 14 has a stopper 17 located at the second end 13. The stopper 17 protrudes from the first slot wall 14. The stopper 17 is provided for stopping the second rail 2 and the movable rail 3 to prevent the second rail 2 and the movable rail 3 from detaching from the first rail 1.

Figure 6:
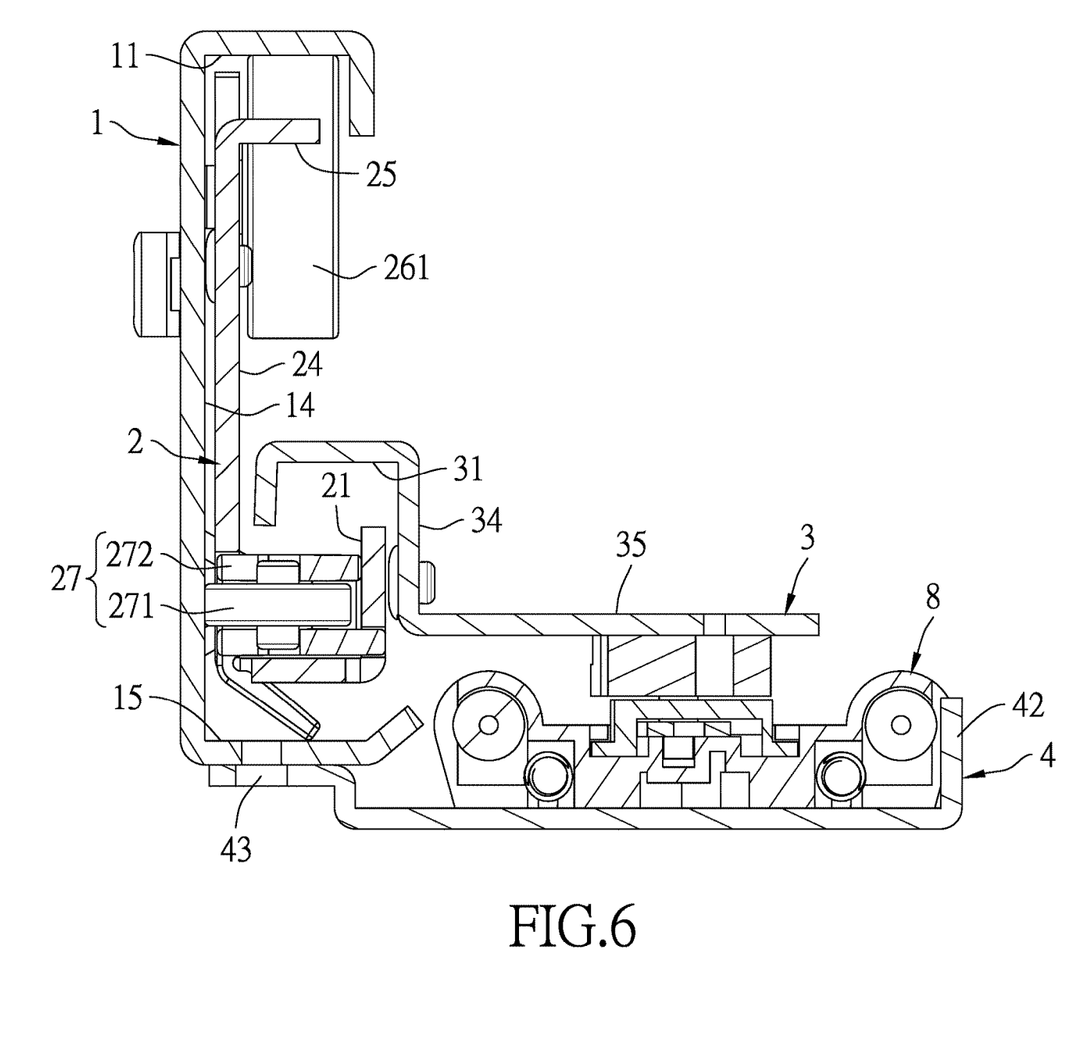
FIG. 6 is a cross-sectional view of a preferred embodiment of the invention.

Please refer to FIG. 2, FIG. 3 and FIG. 6. The second rail 2 is in the shape of a long strip. The second rail 2 has a third end 22 and a fourth end 23 disposed oppositely. The second rail 2 has a second slot wall 24, a second transverse wall is connected to one side of the second slot wall 24, and the second transverse wall is generally L-shaped. The second slot wall 24 and the second transverse wall surround to form a second trough 21. Another side of the second slot wall 24 is connected to a second side wall 25. The second rail 2 further has a roller set 26 and a side roller assembly 27, the roller set 26 has a plurality of rollers 261, some of the rollers 261 are rotatably mounted in the second trough 21 and penetrate the second trough 21. Some of the rollers 261 are rotatably mounted on the second slot wall 24. The rollers 261 are provided to make the second rail 2 to move back and forth in the sliding direction X relative to the first rail 1 and the movable rail 3. More specifically, the rollers 261 can be front rollers, compression rollers, auxiliary rollers, rear rollers, middle upper rollers, etc., but are not limited thereto. The side roller assembly 27 has a side roller 271 and a position-limiting unit 272, the side roller assembly 27 penetrates the second slot wall 24, the side roller 271 is disposed perpendicularly to a disposing direction of the rollers 261, the side roller 271 is rotatably mounted on the position-limiting unit 272, the position-limiting unit 272 is mounted in the second trough 21, and the position-limiting unit 272 limits a position of the side roller 271. The side roller 271 abuts against the first slot wall 14, and the side roller 271 is provided to space the second rail 2 from the first rail 1, so that the second rail 2 is capable of displacing relative to the first rail 1 more smoothly along the sliding direction X, as shown in FIG. 6, the side roller assembly 27 is mounted at a position close to the fourth end 23, but it is not limited thereto.

Please refer to FIG. 2, FIG. 3 and FIG. 6. The movable rail 3 is in the shape of a long strip. The movable rail 3 has a fifth end 32 and a sixth end 33 disposed oppositely. The movable rail 3 has a third slot wall 34, a third transverse wall is connected to one side of the third slot wall 34, and the third transverse wall is generally L-shaped. The third slot wall 34 and the third transverse wall surround to form a third trough 31. Another side of the third slot wall 34 is connected to a third side wall 35. The third side wall 35 has a hook 351, and the hook 351 penetrates the third side wall 35.

Figure 4:
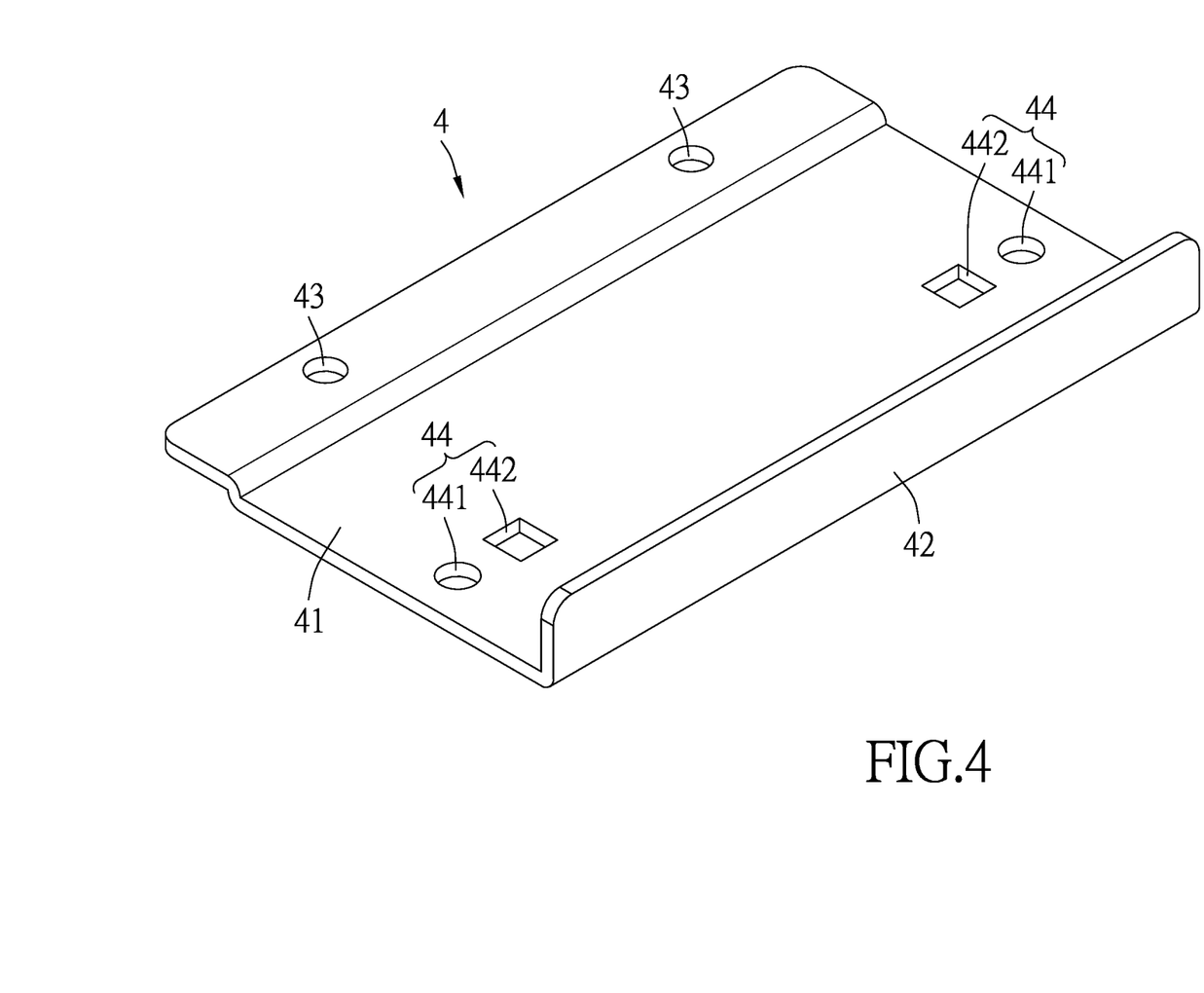
FIG. 4 is an enlarged view of a buffer seat of a preferred embodiment of the invention.
Figure 5:
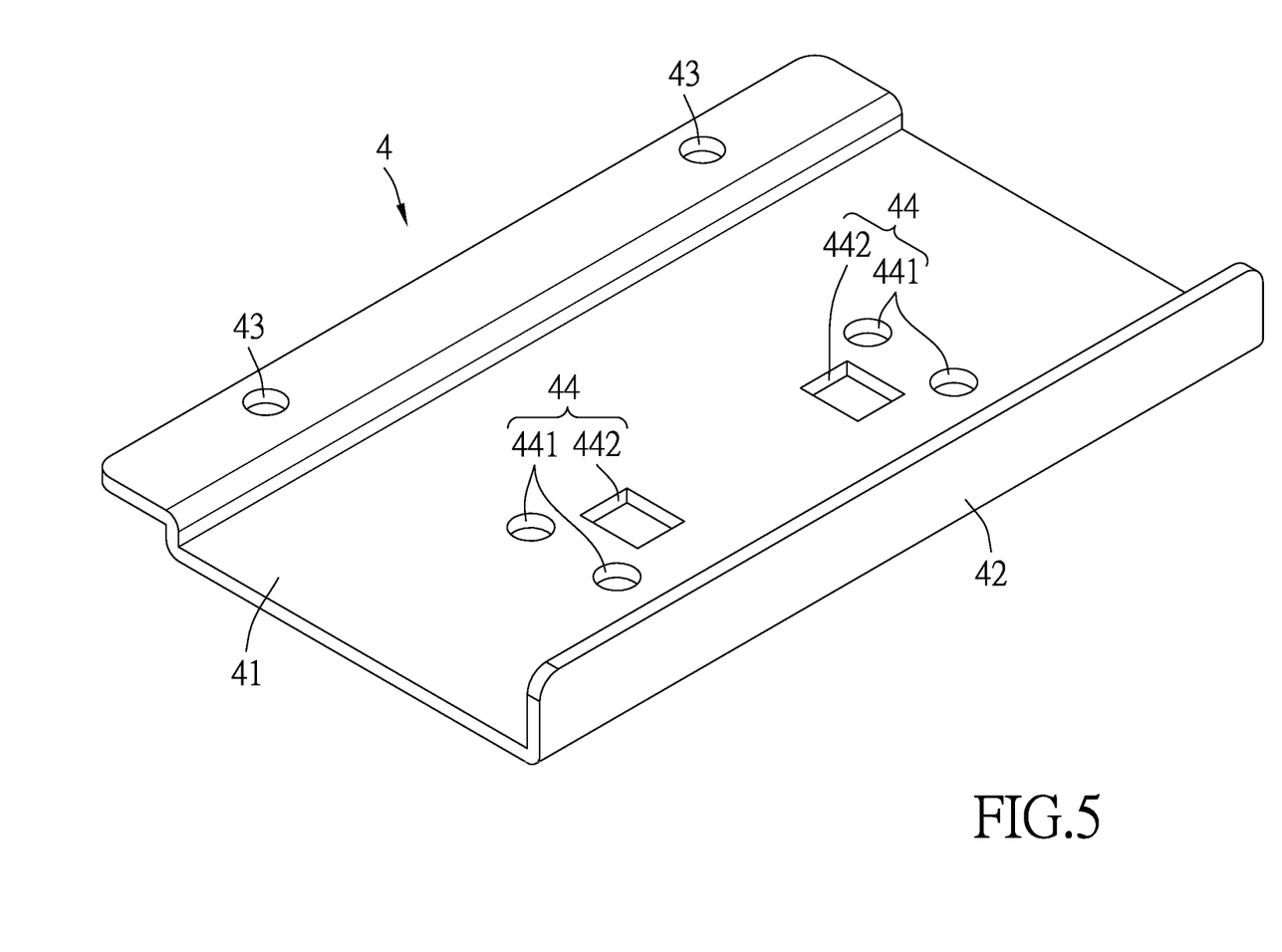
FIG. 5 is an enlarged view of the buffer seat of a preferred embodiment of the invention.
Figure 7:
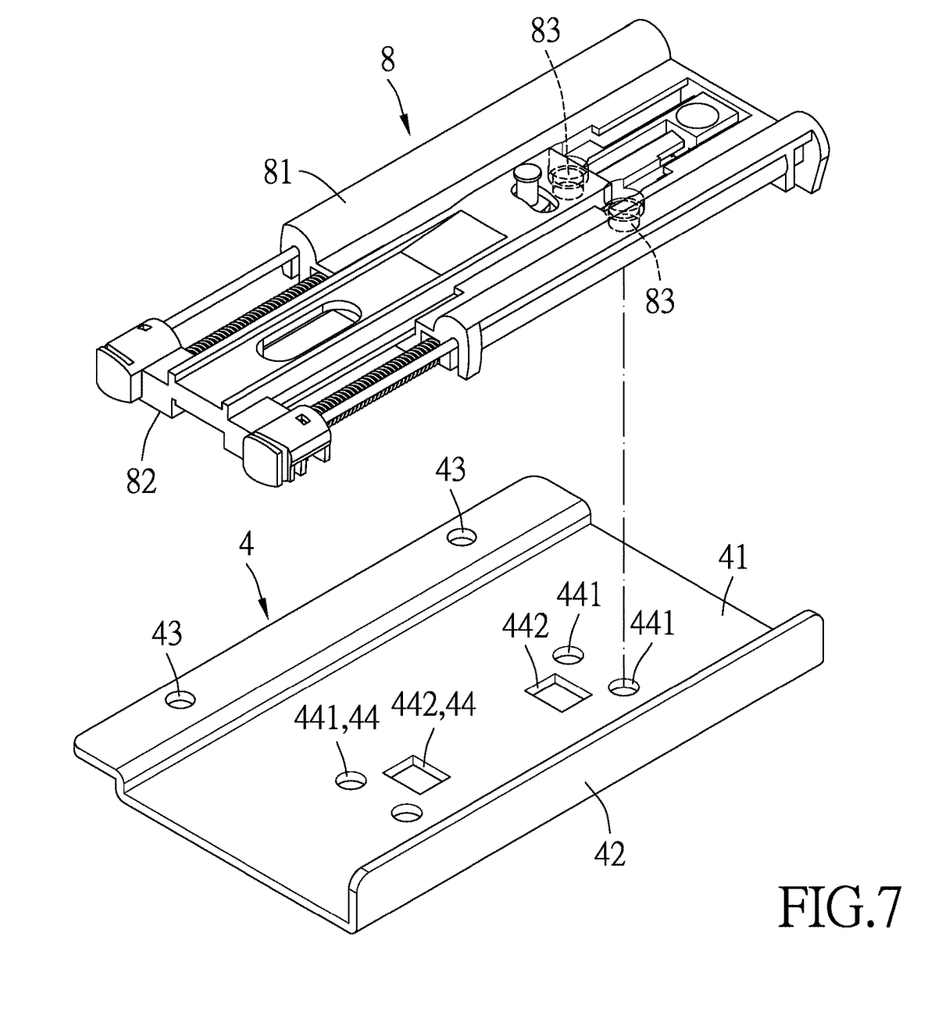
FIG. 7 is an exploded view of a buffer and the buffer seat of a preferred embodiment of the invention.

Please refer to FIGS. 4, 5 and 7. The buffer seat 4 has a surface plate 41 and a side plate 42 connected to one end of the surface plate 41. The side plate 42 and the surface plate 41 extend in different directions. Preferably, extending directions of the side plate 42 and the surface plate 41 are substantially perpendicular to each other. The surface plate 41 is provided to carry a buffer 8, and the side plate 42 is provided to protect the buffer 8 to prevent the buffer 8 from colliding with the drawer. Another end of the surface plate 41 not connected to the side plate 42 has at least one first lock hole 43, the first lock hole 43 penetrates the surface plate 41, and the first lock hole 43 is provided to mount the buffer seat 4 on the first rail 1, as shown in FIG. 2. The first lock hole 43 is aligned with the positioning lock hole 16, and through locking components, such as but not limited to bolts, passing through the first lock hole 43 and the positioning lock hole 16, the buffer seat 4 can be combined with the first rail 1. Please refer to FIG. 4. The surface plate 41 has two engaging units 44. The two engaging units 44 are located between the side plate 42 and the first lock hole 43, the two engaging units 44 respectively have at least one second lock hole 441 and an engaging hole 442. The two engaging units 44 are disposed symmetrically, and the engaging holes 442 are provided to mount the buffer 8. The second lock holes 441 are provided to lock the buffer 8 to the buffer seat 4. Please refer to FIG. 5. In one embodiment, the two engaging units 44 respectively comprise the engaging hole 442 and the two second lock holes 441, but are not limited thereto. The two second lock holes 441 and the engaging hole 442 penetrate the surface plate 41, and the two second lock holes 441 are closer to the side plate 42 than the first lock hole 43. It is worth noting that, as shown in FIGS. 4 and 5, since the buffer seat 4 has the two symmetrical engaging units 44, and the two engaging units 44 are disposed in mirror symmetry on the surface plate 41, so that the buffer 8 can be mounted on the buffer seat 4 corresponding to two ends of the cabinet. The buffer seat 4 has a two-way assembly function. The buffer 8 is not limited by different disposing directions of the buffer seat 4.

Figure 8:
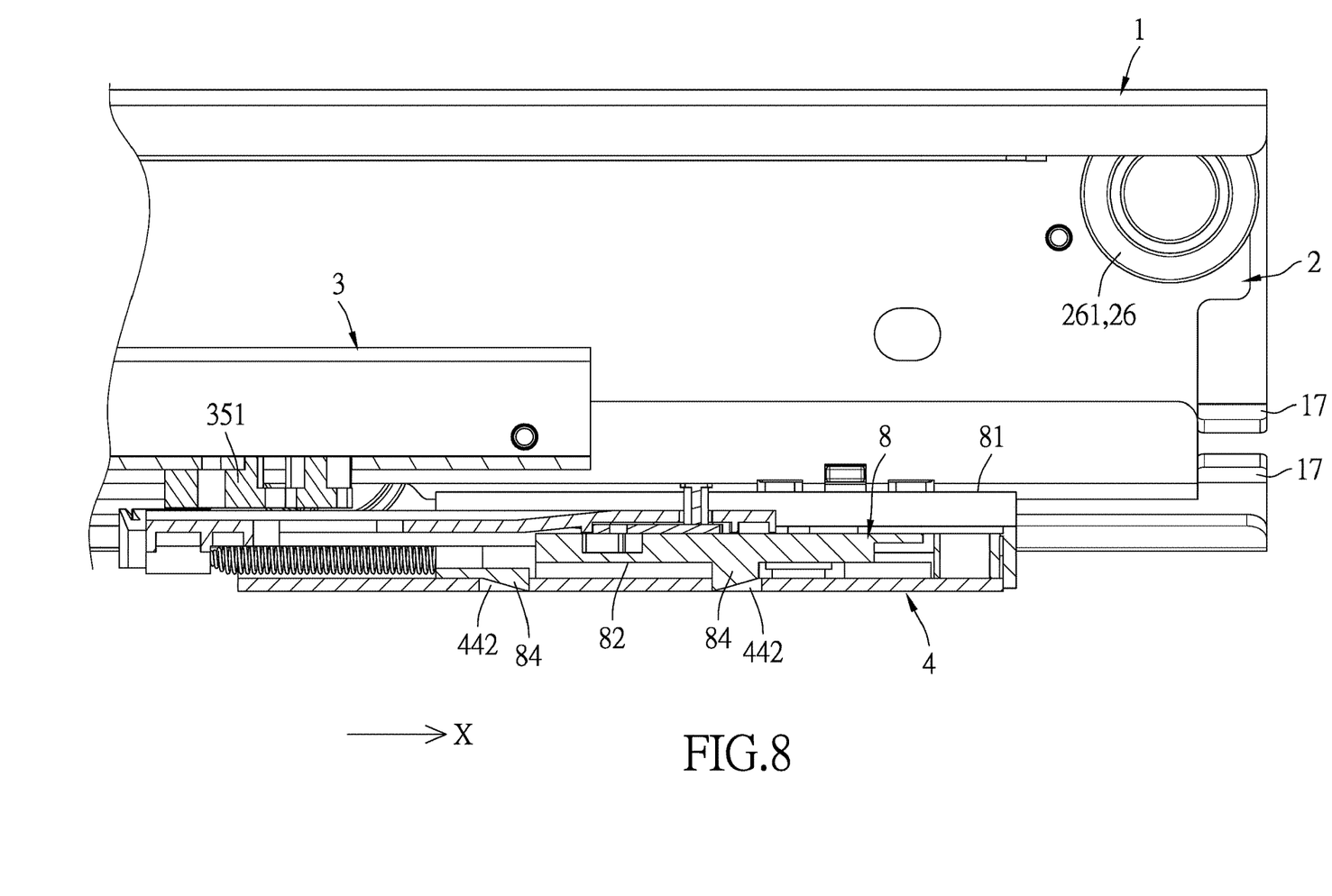
FIG. 8 is a cross-sectional view of combination of the buffer and the buffer seat of a preferred embodiment of the invention.

Please refer to FIGS. 7 and 8. The buffer 8 is a conventional technology. The buffer 8 is provided to enable the second rail 2 and the movable rail 3 to be introduced into the first rail 1 smoothly at a uniform speed, and reduce impact sound of the second rail 2, the first rail 1 and the movable rail 3. The buffer 8 has a top surface 81 and a bottom surface 82 opposite to the top surface 81. The buffer 8 further has at least one damper lock hole 83 and at least one damper hook 84, the damper lock hole 83 penetrates the buffer 8, the damper hook 84 protrudes from the bottom surface 82. Please refer to FIG. 8 and FIG. 7. In this embodiment, a number of the damper hooks 84 is two, but it is not limited thereto. When the buffer seat 4 is combined with the buffer 8, the two damper hooks 84 are engaged in the two engaging holes 442, and then by using locking components such as bolts passing through the second lock hole 441 and the damper lock hole 83 for locking, the buffer 8 can be firmly combined with the buffer seat 4, and the buffer 8 will not detach from the buffer seat 4, thereby causing the movable rail 3 to engage with the buffer 8 when moving in the sliding direction X. Using the principle of elasticity, the buffer 8 drives the movable rail 3 to move in the sliding direction X, thereby achieving efficacies of easing off external forces and consuming kinetic energy. The above-mentioned technologies of the first rail 1, the second rail 2, the movable rail 3 and the buffer 8 are based on existing technologies currently available on the market, so they will be briefly described.

Figure 11:
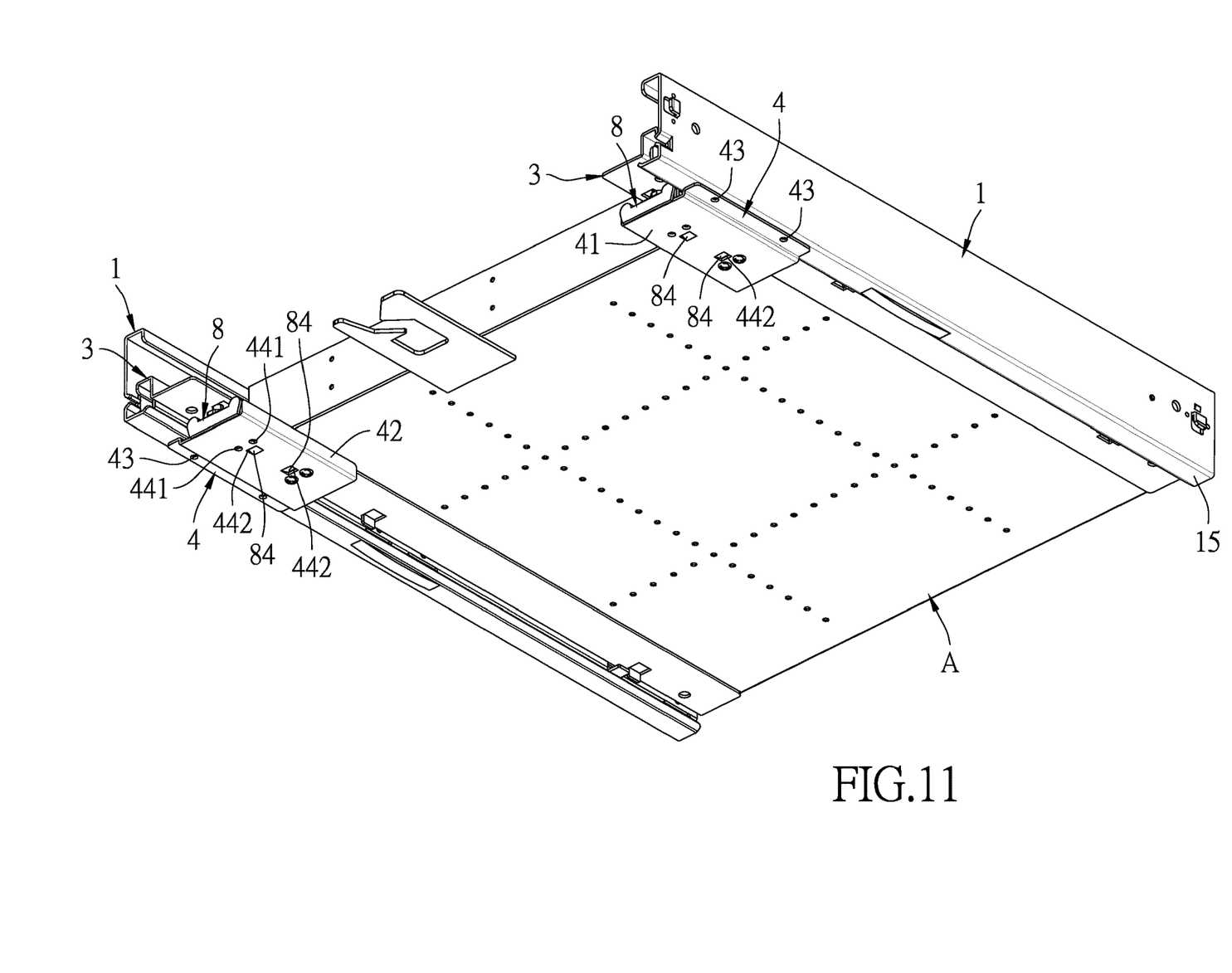
FIG. 11 is a schematic diagram of combination of the buffer seat and the drawer of a preferred embodiment of the invention.

Please refer to FIG. 11 for a second embodiment of the invention. The difference from the first embodiment is that the second embodiment only has the first rail 1, the movable rail 3 and the buffer seat 4. The movable rail 3 is mounted on the first rail 1. The roller set 26 and the side roller assembly 27 are provided between the movable rail 3 and the first rail 1, so that the movable rail 3 is capable of moving relative to the first rail 1. The slide rail structure that only includes the movable rail 3 and the first rail 1 is a conventional technology and therefore will not be described in detail herein. The buffer seat 4 is combined with the first rail 1. More specifically, by locking the surface plate 41 of the buffer seat 4 with the first side wall 15, the second embodiment of the invention has the same technical efficacies as the first embodiment.

The above is the structure and configuration description of the main components of the invention. The following is a further explanation of the technical means adopted by the invention to achieve the predetermined novel objects in conjunction with the drawings and embodiments of the invention.

Figure 9:
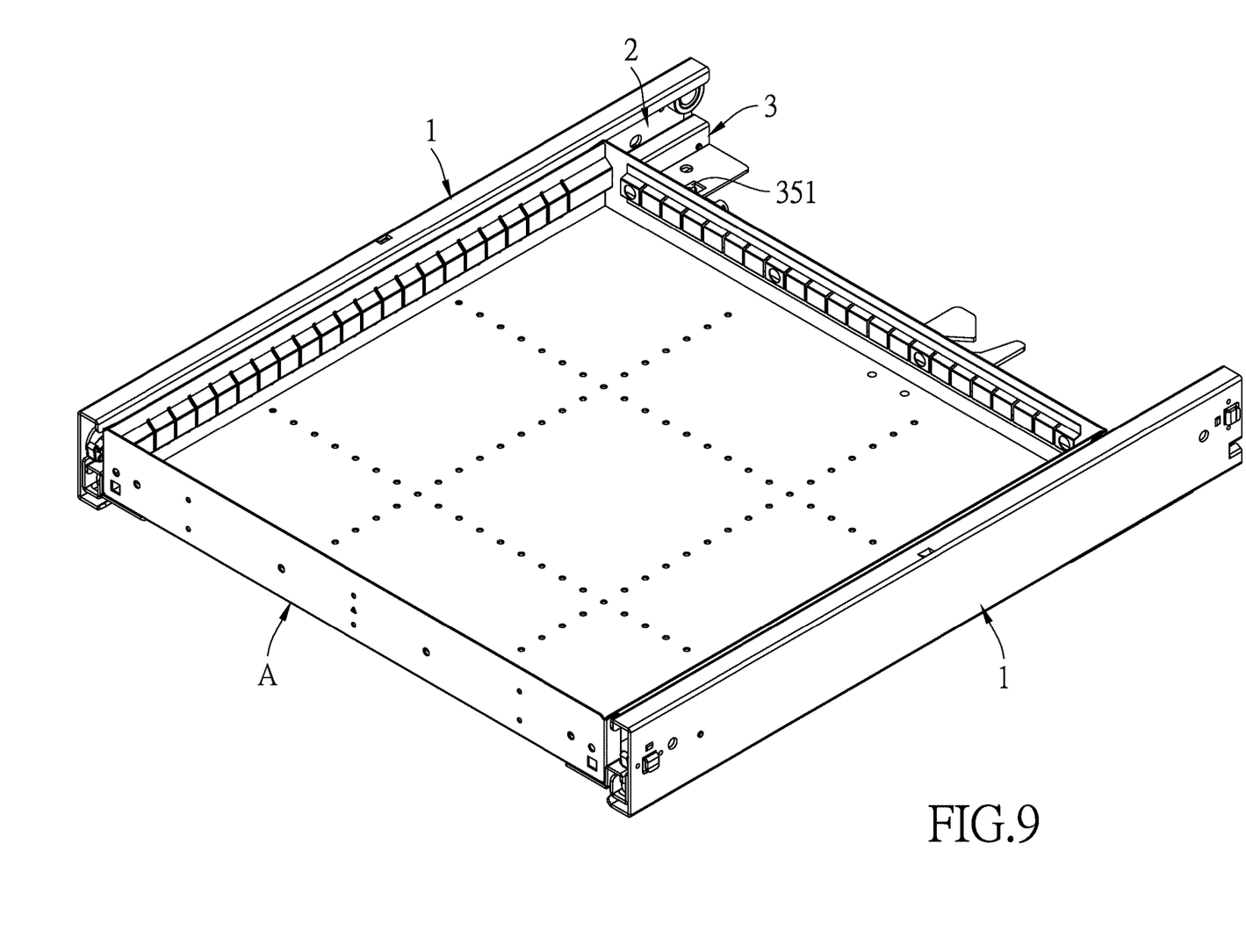
FIG. 9 is a schematic diagram of a drawer assembly of a preferred embodiment of the invention.
Figure 10:
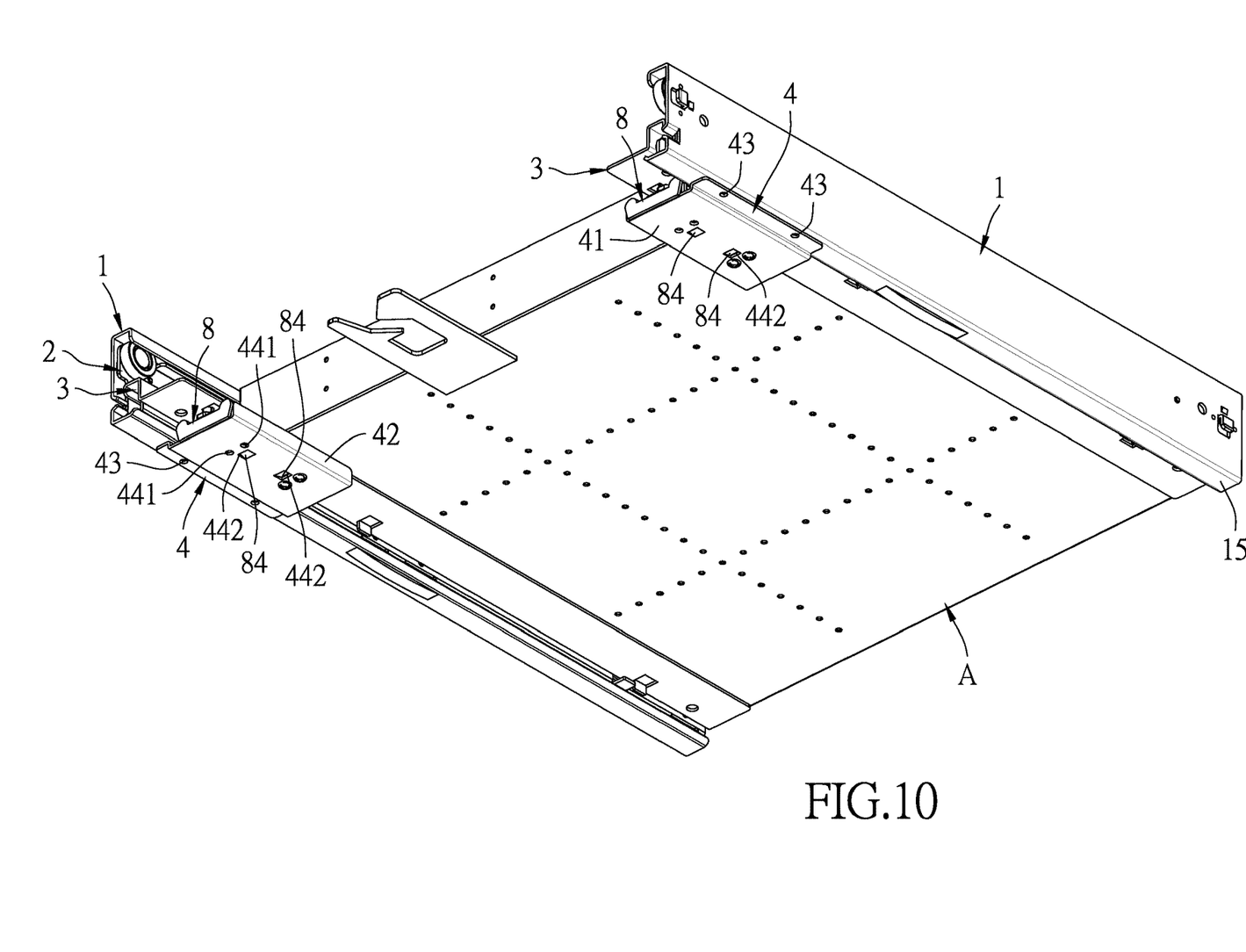
FIG. 10 is a schematic diagram of the drawer assembly of a preferred embodiment of the invention viewed from another angle.

Please refer to FIGS. 9 and 10. Two sides of a drawer A are respectively provided with the slide rail structure with the buffer seat of the invention. By mounting the buffer seat 4 on the first side wall 15 of the first rail 1 and extending from the first side wall 15, the buffer 8 can be mounted on the buffer seat 4 without being mounted on the second slot wall 24; in addition, please refer to FIG. 10, because the two first rails 1 are located on the two sides of the drawer A, so assembly directions of the two buffer seats 4 are different, and because the engaging units 44 of the two buffer seats 4 are symmetrically disposed, the buffer 8 can be mounted on the buffer seats 4 with different assembly directions without hindrance.

Summing up the above, it can be known that the invention has the following efficacies. Firstly, by fixing the buffer seat 4 to the first rail 1, it prevents travel paths of the rollers 261 from overlapping with a position of the buffer 8, and in this embodiment, the buffer seat 4 is fixed to the first rail 1 by locking with screws, which can be easily assembled without performing complicated steps and have high stability; secondly, the buffer seat 4 has the two engagement units 44 capable of providing mounting in different directions, that can be mounted on the two sides of the drawer A or mounting directions can be adjusted according to different requirements or spaces, which improves the flexibility and adaptability of use; thirdly, the roller set 26 and the side roller assembly 27 are disposed on the second rail 2 or the movable rail 3 to replace conventional balls, size or material of the roller set 26 and the side roller assembly 27 can be changed according to the first rail 1, the second rail 2 and the movable rail 3, in this embodiment, the roller set 26 and the side roller assembly 27 are made of polyurethane, highly elastic rubber or nylon, which have excellent load-bearing and wear-resistance, so that the invention is capable of providing buffering efficacies of high load and wear-resistant, and the invention can be assembled in the drawer A loaded with heavy objects; fourthly, by changing a mounting position of the buffer 8 through the buffer seat 4 without interfering with the second rail 2 or/and the movable rail 3 in the sliding direction X, the invention is capable of providing buffering effect, and capable of reducing friction and noise, and saving space.

Although the specific embodiments of the invention are disclosed in the above implementation modes, they are not intended to limit the invention. The specification relating to the above embodiments should be construed as exemplary rather than as limitative of the invention, with many variations and modifications being readily attainable by a person having ordinary skill in the art to which the invention pertains without departing from the principles and spirit thereof as defined by the appended claims and their legal equivalents.

What is claimed is:
1. A slide rail structure with a buffer seat, comprising:
a first rail having a first slot wall and a first side wall connected to the first slot wall, the first slot wall and the first side wall extending in different directions;
a movable rail mounted on the first rail and capable of slidably moving relative to the first rail; and
a buffer seat mounted on the first side wall, the buffer seat having two engaging units, the two engaging units being disposed oppositely.
2. The slide rail structure with the buffer seat as claimed in claim 1, wherein the first rail has at least one positioning lock hole, the buffer seat has at least one first lock hole, and the first lock hole is lockingly combined with the positioning lock hole.
3. The slide rail structure with the buffer seat as claimed in claim 1, wherein the engaging unit has an engaging hole and at least one second lock hole.
4. The slide rail structure with the buffer seat as claimed in claim 1, wherein the two engaging units are disposed in mirror symmetry on the buffer seat.
5. The slide rail structure with the buffer seat as claimed in claim 1, wherein the first rail further has a stopper, the stopper protrudes from the first slot wall.
6. The slide rail structure with the buffer seat as claimed in claim 1, further comprising a second rail, the second rail is disposed between the first rail and the movable rail, and the second rail slides relative to the first rail.
7. The slide rail structure with the buffer seat as claimed in claim 6, wherein the second rail has a roller set, the roller set has a plurality of rollers, and the rollers enable the second rail to slide relative to the first rail.
8. The slide rail structure with the buffer seat as claimed in claim 6, wherein the second rail further has a side roller assembly, the side roller assembly penetrates the second rail, the side roller assembly has a side roller and a position-limiting unit, the side roller is rotatably mounted on the position-limiting unit, and the side roller abuts against the first slot wall.

* * * * *